(12) United States Patent
Crook et al.

(10) Patent No.: US 8,775,284 B1
(45) Date of Patent: Jul. 8, 2014

(54) SYSTEM AND METHOD FOR EVALUATING FRAUD SUSPECTS

(75) Inventors: Thomas J. Crook, Rowlett, TX (US); Mark J. Nigrini, Allen, TX (US); John W. Howell, Chicago, IL (US)

(73) Assignee: VECTORsgi, Inc., Addison, TX (US)

(*) Notice: Subject to any disclaimer, the term of this patent is extended or adjusted under 35 U.S.C. 154(b) by 1673 days.

(21) Appl. No.: 09/545,046

(22) Filed: Apr. 7, 2000

(51) Int. Cl.
*G06Q 40/00* (2012.01)
*G06Q 40/02* (2012.01)
*G06Q 30/06* (2012.01)
*G06Q 20/00* (2012.01)

(52) U.S. Cl.
CPC ............... *G06Q 40/00* (2013.01); *G06Q 40/02* (2013.01); *G06Q 30/06* (2013.01); *G06Q 20/00* (2013.01)
USPC ................... 705/35; 705/39; 705/40; 705/42; 235/379; 235/380

(58) Field of Classification Search
CPC ....... G06Q 40/00; G06Q 40/02; G06Q 30/06; G06Q 20/00
USPC ................... 705/38, 35, 44, 50, 57, 1, 40, 42; 379/145; 235/379, 380
See application file for complete search history.

(56) References Cited

U.S. PATENT DOCUMENTS

| | | | | |
|---|---|---|---|---|
| 4,734,564 A | * | 3/1988 | Boston et al. | 235/380 |
| 4,755,940 A | * | 7/1988 | Brachtl et al. | 705/44 |
| 4,812,628 A | * | 3/1989 | Boston et al. | 235/380 |
| 4,977,595 A | * | 12/1990 | Ohta et al. | 705/69 |
| 5,175,682 A | * | 12/1992 | Higashiyama et al. | 705/45 |
| 5,177,342 A | * | 1/1993 | Adams | 235/379 |
| 5,311,594 A | * | 5/1994 | Penzias | 713/183 |
| 5,321,751 A | * | 6/1994 | Ray et al. | 713/186 |
| 5,386,104 A | * | 1/1995 | Sime | 235/379 |
| 5,495,521 A | * | 2/1996 | Rangachar | 379/93.04 |
| 5,627,886 A | * | 5/1997 | Bowman | 379/111 |
| 5,783,808 A | | 7/1998 | Josephson | |
| 5,819,226 A | * | 10/1998 | Gopinathan et al. | 705/44 |
| 5,895,453 A | | 4/1999 | Cook | |
| 5,910,988 A | | 6/1999 | Ballard | 380/24 |
| 5,970,129 A | * | 10/1999 | Asfar et al. | 379/144.01 |
| 5,995,604 A | * | 11/1999 | Chan et al. | 379/145 |
| 6,012,042 A | * | 1/2000 | Black et al. | 705/36 |

(Continued)

FOREIGN PATENT DOCUMENTS

| WO | 99/52267 | 10/1999 |
|---|---|---|
| WO | 00/55784 | 9/2000 |

OTHER PUBLICATIONS

Nigrini, Mark J. et al., "The Use of Benford's Law as an Aid in Analytical Procedures," *Auditing: A Journal of Practice & Theory*, vol. 16, No. 2, Fall 1997, 16 pages.

(Continued)

*Primary Examiner* — Daniel Felten
(74) *Attorney, Agent, or Firm* — Fish & Richardson P.C.

(57) ABSTRACT

A method for evaluating fraud suspects is provided that includes receiving suspect data identifying a plurality of suspects of a fraud. Monetary transaction information associated with the fraud is received for the suspects. For each suspect, a value for each of a plurality of criteria associated with the fraud is determined based on the monetary transaction information. Criteria weights are applied to the values for each suspect to generate a score for the suspect indicative of a likelihood of fraud.

32 Claims, 3 Drawing Sheets

(56) References Cited

U.S. PATENT DOCUMENTS

| | | | |
|---|---|---|---|
| 6,032,137 A | 2/2000 | Ballard | 705/75 |
| 6,094,643 A * | 7/2000 | Anderson et al. | 705/44 |
| 6,163,604 A * | 12/2000 | Baulier et al. | 379/189 |
| 6,446,072 B1 | 9/2002 | Schulze et al. | 707/10 |
| 6,516,056 B1 * | 2/2003 | Justice et al. | 379/145 |
| 2003/0037002 A1 | 2/2003 | Higgins et al. | 705/45 |

OTHER PUBLICATIONS

*General Information Manual, Vector: Kite*, Sterling Commerce, 1998, 33 pages.

"Digital Analysis Tests and Statistics Datas—Datas 2000 for Excel 97," Mark J. Nigrini, 2000, 11 pages.

"Digital Analysis Tests and Statistics Datas—Datas 2000 for ACL: Description of Programs," 2000, 23 pages.

Office Action issued in Australian Application No. 2001251403 on Nov. 2, 2005, 2 pages.

Office Action issued in Canadian Application No. 2405422 on Dec. 4, 2009, 4 pages.

Office Action issued in Canadian Application No. 2405422 on Dec. 15, 2011, 3 pages.

Communication issued in EP Application 019247808.8 on May 23, 2006, 5 pages.

Communication issued in EP Application 019247808.8 on Apr. 3, 2008, 12 pages.

Communication issued in EP Application 019247808.8 on Aug. 27, 2008, 6 pages.

Communication issued in Canadian Application No. 2405422 on Jun. 11, 2013, 5 pages.

\* cited by examiner

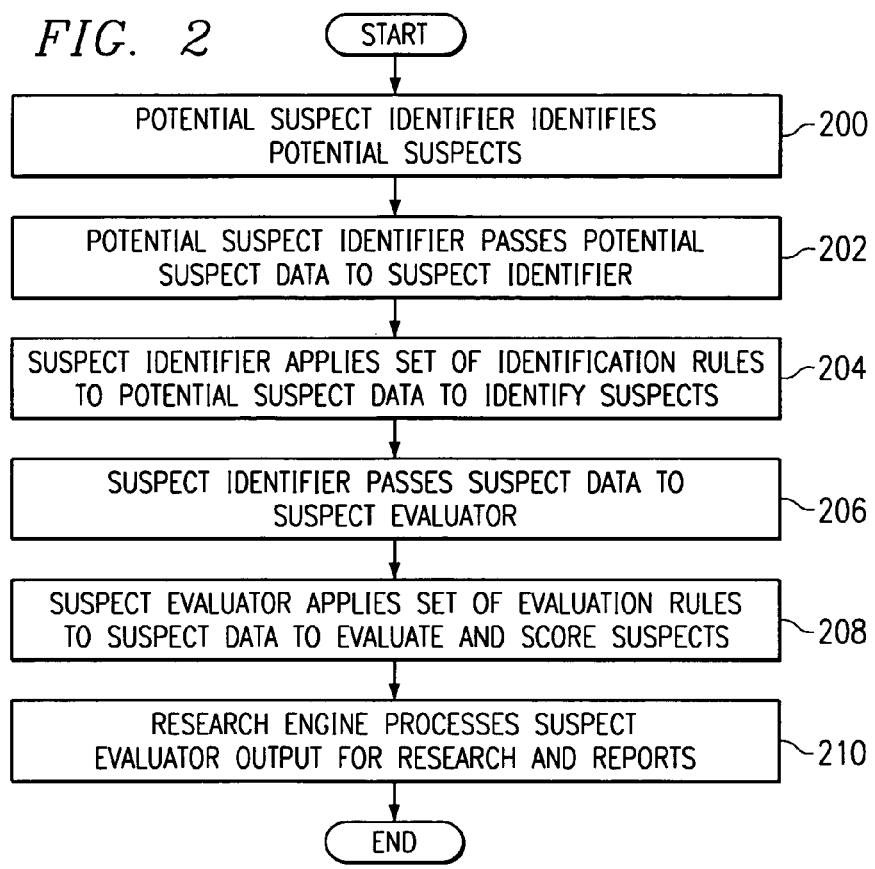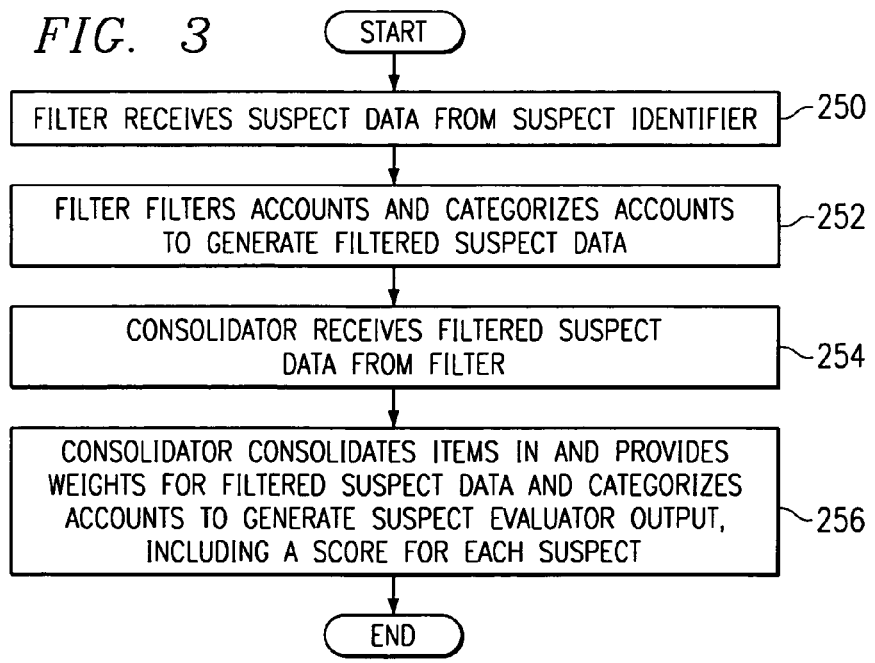

| RANK | ACCOUNT/ ROUTE | PROP USED | ROUND FACTOR | EQUAL FACTOR | DEPOSITS | TIME FRAME | DAYS WITH DEPOSITS | FOUR-DAY THOUSANDS | RETURN INDICATOR | SCORE | CUSTOMER ID |
|---|---|---|---|---|---|---|---|---|---|---|---|
| 1 | 111/222 | 0.800 | 1.000 | 0.012 | 18 | 10 | 07 | 218 | 0 | 0.67125 | 12345 |
| 2 | 333/444 | 0.673 | 0.000 | 0.000 | 07 | 06 | 03 | 137 | 0 | 0.51326 | 67890 |
| 3 | 555/666 | 1.000 | 0.000 | 0.662 | 13 | 10 | 08 | 14 | 0 | 0.49718 | 11111 |
| 4 | 333/777 | 0.729 | 1.000 | 0.760 | 08 | 07 | 05 | 72 | 1 | 0.42137 | 67890 |
| ... | | | | | | | | | | | |
| 14 | 888/999 | 1.000 | 0.667 | 0.000 | 04 | 02 | 01 | 12 | 0 | 0.08124 | 54321 |
| 15 | 000/666 | 0.414 | 1.000 | 0.000 | 03 | 01 | 01 | 17 | 0 | 0.04319 | 09876 |

*FIG. 4*

SYSTEM AND METHOD FOR EVALUATING FRAUD SUSPECTS

TECHNICAL FIELD OF THE INVENTION

This invention relates generally to fraud detection systems and more particularly to a system and method for evaluating fraud suspects.

BACKGROUND OF THE INVENTION

Within the banking industry, losses due to kiting and check fraud have been rapidly increasing. New financial marketing strategies and institutional policies providing for accelerated customer availability schedules have contributed to the opportunity for increased kiting and check fraud. Additionally, the availability of technology such as personal computers and desktop publishing systems has allowed kiting schemes to be perpetrated more easily and has allowed perpetrators to avoid detection for longer periods of time or to evade detection altogether.

Reductions in staffing levels have also contributed to increased opportunities for kiting and check fraud. Fewer research analysts are available to handle the large volume of kite suspect accounts identified by previously developed kite suspect detection systems. The laborious effort involved in gathering suspect transactions, analyzing and researching the transactions, and pulling copies of the transactions to verify a suspected kite requires a considerable amount of time. As a result of the workload volume and reduced staffing, losses are often incurred before the check kite is identified.

SUMMARY OF THE INVENTION

In accordance with the present invention, a system and method for evaluating fraud suspects are provided that substantially eliminate or reduce disadvantages and problems associated with previously developed systems and methods. In particular, fraud suspects are evaluated and provided with a score that represents the likelihood that the suspect is actually engaged in fraud. Thus, the suspects may be ranked in a meaningful way and high priority suspects targeted for further analysis and investigation, reducing time and labor requirements for detecting fraud.

In one embodiment of the present invention, a method for evaluating fraud suspects is provided that includes receiving suspect data identifying a plurality of suspects of a fraud. Monetary transaction information associated with the fraud is received for the suspects. For each suspect, a value for each of a plurality of criteria associated with the fraud is determined based on the monetary transaction information. Criteria weights are applied to the values for each suspect to generate a score for the suspect indicative of a likelihood of fraud.

Technical advantages of the present invention include providing an improved system for detecting fraud. In particular, fraud suspects identified by a suspect detection system are evaluated based on statistical analysis of parameters particularly indicative of the fraud. As a result, the fraud suspects may be prioritized or ranked according to the likelihood that the suspects are actually involved in a fraudulent scheme. Accordingly, a large majority of fraud suspects may be eliminated as suspects, while nearly all of the potential losses from the fraud are discoverable by researching and analyzing the relatively few remaining suspects.

Another technical advantage of the present invention includes an improved method and system for operating a financial institution. In particular, fraud suspects are prioritized to increase productivity and effectiveness of research for rapid identification of potential fraud. As a result, losses due to fraud are reduced.

Still another technical advantage of the present invention includes providing an improved method and system for identifying check kiting schemes. In particular, check kite suspects are prioritized based on the likelihood that they are actually involved in a kiting scheme. Thus, available investigation resources may be focused on the high priority suspects who account for the vast majority of the fraud.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 2 is a flow diagram illustrating a method for identifying and evaluating fraud suspects in accordance with one embodiment of the present invention;

FIG. 3 is a flow diagram illustrating a method for evaluating fraud suspects with the suspect evaluator of FIG. 1 in accordance with one embodiment of the present invention; and FIG. 4 is one embodiment of a report generated by the report generator of FIG. 1.

DETAILED DESCRIPTION OF THE INVENTION

Figure 1:
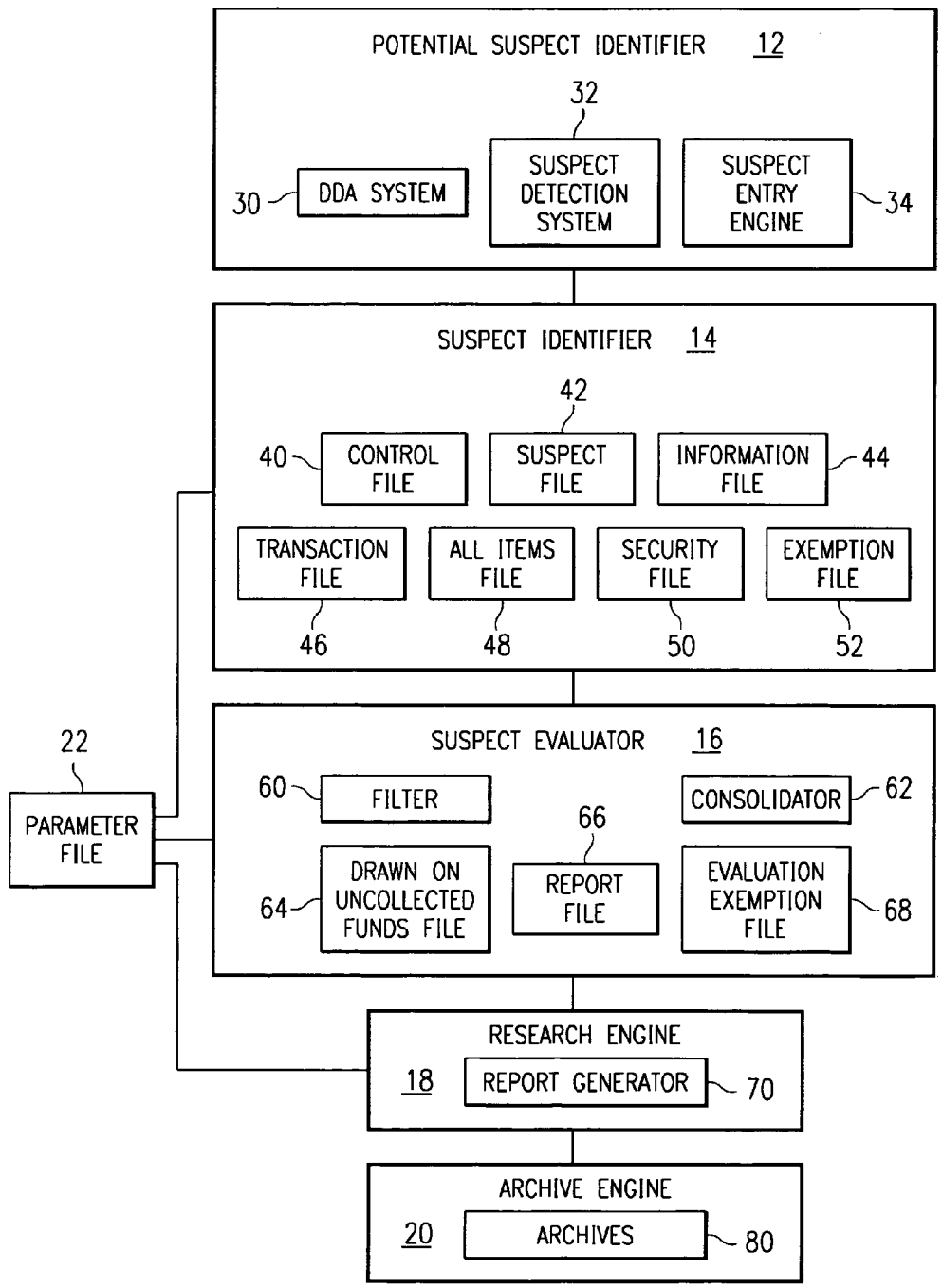
FIG. 1 is a block diagram illustrating a system for identifying and evaluating fraud suspects in accordance with one embodiment of the present invention.

FIG. 1 is a block diagram illustrating a system 10 for identifying and evaluating fraud suspects in accordance with one embodiment of the present invention. The evaluation system 10 may be used for fraud analysis and validation. For example, the system 10 may be used in the detection and evaluation of suspects who may be engaged in kiting, check fraud, deposit fraud, insurance fraud, mutual fund fraud, or other similar types of monetary fraud. Thus, although the system 10 will be described in connection with the detection of kite schemes, it will be understood that the evaluation system 10 may be used to detect and evaluate other types of fraud suspects without departing from the scope of the present invention.

The evaluation system 10 comprises a potential suspect identifier 12 for generating potential suspect data to identify potential suspects, a suspect identifier 14 for generating suspect data based on the potential suspect data to identify suspects, a suspect evaluator 16 for evaluating suspects based on the suspect data, a research engine 18 for providing research and reporting capabilities, an archive engine 20 for storing and retrieving data, and a parameter file 22 for storing user-defined parameters.

In accordance with one embodiment of the present invention, the potential suspect identifier 12 may comprise a demand deposit account (DDA) system 30, a suspect detection system 32 and/or a suspect entry engine 34 for identifying potential suspects. The DDA system 30 may identify potential suspects based on transaction activity such as velocity of deposits to withdrawals, drawing on uncollected funds, and other suitable deposit and withdrawal patterns. The suspect detection system 32 may comprise a conventional suspect detection system implemented by a financial institution and may identify potential suspects based on monetary transaction information relating to a plurality of monetary items. The suspect entry engine 34 allows a user of the system 10 to specifically identify accounts to be included as potential suspects. The potential suspect identifier 12 generally provides a relatively large amount of potential suspect data to the suspect identifier 14. The potential suspect data may include a list of potential suspects along with corresponding monetary transaction information.

The suspect identifier 14 applies a set of identification rules to the potential suspect data from the potential suspect identifier 12 in order to identify a number of actual suspects. According to an exemplary embodiment, the identification rules detect accounts that have had two or more deposits from the same financial institution within a certain period of time, two or more returns from and/or to the same financial institution within a certain period of time, and two or more cash deposits exceeding a specified amount within a certain period of time. It will be understood that other suitable identification rules may be utilized without departing from the scope of the present invention. For example, with regard to check fraud, the identification rules may detect checks having an unusual serial number, a dollar amount out of a normal range, a number of checks within a certain period of time out of a normal range, or other suitable check-fraud criteria. With regard to deposit fraud, the identification rules may detect accounts based on deposit frequencies, dollar amounts, numbers of deposits, amounts of cash deposited and withdrawn, or other suitable deposit-fraud criteria.

In order to identify suspects in accordance with the exemplary embodiment, the suspect identifier 14 utilizes a plurality of files: a control file 40, a suspect file 42, an information file 44, a transaction file 46, an all items file 48, a security file 50 and an exemption file 52. The control file 40 provides centralized control over all user options, including optional detection, validation and research procedures, and the like. Each financial institution implementing the system 10 may define parameters for the parameter file 22 in accordance with the financial institution's unique requirements and policies through the control file 40. For example, these parameters may include a number of days to retain detail items, fraud detection criteria, fraud validation criteria, types of transactions to be considered in research, a method for purging customer and account data, exemptions of detail items such as payroll deposits, and the like.

The suspect file 42 contains customer and account data for potential suspects identified by the potential suspect identifier 12. All potential suspects are established in a suspect file 42 for further validation and research. Customer and account data for the potential suspects is established and monitored on an ongoing basis to detect accounts satisfying the identification rules. The suspect file 42 may also include information such as beginning and ending dates for research, status, account officer, exempted detail items, and the like.

The information file 44 may be used to identify and establish all related accounts for a potential fraud suspect. Thus, the potential suspect's entire relationship can be researched for evidence of fraud. The information file 44 may also be used to verify customer data added to the system 10 or to reference a specific customer when accounts are identified by the potential suspect identifier 12.

The transaction file 46 consolidates specific transaction information on customers and accounts identified as potential fraud suspects by the potential suspect identifier 12. Both current and historical transactions may be accumulated in the transaction file 46. Detailed transaction information is identified in the transaction file 46 by several indicators, such as type of transaction, transaction sequence number, source of transaction, and the like. The control file 40 may specify at the system and/or the financial institution level how much historical transaction information is to be included in the transaction file 46. Historical transactions that are available may be added when a customer is identified as a potential suspect. The transaction file 46 is also updated each day to retain all the transactions for identified potential suspects.

The all items file 48 provides a transaction database. This database includes both current and historical transactions. The all items file 48 may include information such as MICR line information, source of receipt/depositor account number, unique item sequence number, processing date, final destination of the transaction, and the like. In addition, the all items file may include transaction information for financial institutions being processed by the financial institution implementing the system 10. This permits a global view of a customer across multiple financial institutions and multiple accounts.

The security file 50 allows internal system security to be maintained at the user and financial institution level, restricting or prohibiting access by function and employee viewing. The exemption file 52 allows any number of detail transaction exemptions to be entered by a user of the system 10. Using the exemption file 52, a user may identify an account for which there is no potential for loss such that the account is not analyzed as a suspect.

After applying the identification rules to generate suspect data, the suspect identifier 14 provides the suspect data to the suspect evaluator 16. The suspect data may include a list of suspects along with corresponding monetary transaction information.

The suspect evaluator 16 applies a set of evaluation rules to the suspect data from the suspect identifier 14 in order to evaluate the likelihood that each suspect is engaged in actual fraud. The evaluation rules are weighted such that satisfying one rule may affect the score to a greater or lesser degree than satisfying another rule. According to the exemplary embodiment, the evaluation rules include rules relating to frequency of deposits, dollar amounts of deposits, and checks written in excess of the collected account balance.

For example, the evaluation rules may detect accounts that have had more than a first specified number of deposits within the past four days or more than a second specified number of deposits within the past ten days. The evaluation rules may also detect accounts that have multiple deposits of the same dollar amount and accounts that have deposits of round dollar amounts. Finally, the evaluation rules may detect accounts for which checks have been written in excess of the account balance, such as accounts having returns from or to the financial institution or accounts which are drawn on uncollected funds. It will be understood that other suitable evaluation rules may be utilized without departing from the scope of the present invention.

The suspect evaluator 16 comprises a filter 60 and a consolidator 62, in addition to a drawn on uncollected funds file 64, a report file 66 and an exemption file 68, for evaluating the suspect data. In accordance with one embodiment, the filter 60 receives the suspect data and user-defined parameters from the parameter file 22. The suspect data may include drawn on uncollected funds information for storing in the drawn on uncollected funds file 64 and may include additional data generated by the suspect identifier 14 for storing in the report file 66. The evaluation exemption file 68 identifies accounts that are not to be evaluated by the suspect evaluator 16. Using the information in the files 64, 66 and 68, the filter 60 filters the suspect data to generate filtered suspect data. In accordance with one embodiment, the filter 60 eliminates those accounts identified in the evaluation exemption file 68, eliminates transactions based on dollar amounts below a minimum specified in the parameter file 22, eliminates transactions for which the corresponding account and routing number do not have a minimum number of transactions, includes accounts identified in the drawn on uncollected funds file 64 for further analysis, and categorizes the suspects based on employee versus non-employee status or other suitable categorization criteria.

The consolidator 62 receives the filtered suspect data from the filter 60 and user-defined parameters from the parameter file 22. Based on the user-defined parameters, the consolidator 62 consolidates items in and provides weights for the filtered suspect data to generate suspect evaluator output for the suspect evaluator 16. The suspect evaluator output includes a score for each suspect that provides an indication of the likelihood that the corresponding suspect is actually engaged in fraudulent behavior. In accordance with one embodiment, the consolidator 62 operates in two phases. In the first phase, the consolidator 62 accumulates transaction data for the financial institution and the account and routing number. Based on tabling, the consolidator 62 determines the number of deposits within one or more specified periods, such as the past four days and the past ten days, the dates on which the deposits were made, and the total dollar amounts of the deposits. In the second phase, the consolidator 62 determines the dollar amounts of each deposit and the applicability of the weighting factors for the different weights used, in addition to providing specific weighting for suspects with uncollected funds and return items. The consolidator 62 then provides a score for each suspect. Also, the consolidator 62 provides a summary record for each suspect and categorizes the suspects based on the total dollar amounts for the deposits or other suitable categorization criteria.

The research engine 18 provides research and control capabilities to users of the system 10. In accordance with one embodiment, the options provided include online researching of transactions for a suspect, maintaining of customer and account records, maintaining of fraud controls at the financial institution level and at the system level, and viewing of customer and account data for suspects. The research engine 18 also provides report generating capabilities through a report generator 70.

The report generator 70 generates a plurality of reports based on the suspect evaluator output received from the suspect evaluator 16 and on user-defined parameters received from the parameter file 22. For example, according to one embodiment, the report generator 70 may generate reports relating to accounts reviewed, accounts not reviewed, potential suspects based on a sub-set of parameters, microfilm requests, and fraud controls, as well as load reports, customer and account reports, exemption reports, and reports relating to recently identified suspect items. It will be understood that the report generator 70 may generate any other suitable reports based on the suspect evaluator output and the user-defined parameters without departing from the scope of the present invention.

The archive engine 20 provides storage and retrieval capabilities for the system 10. The archive engine 20 comprises an archives database 80 for storing data. In accordance with one embodiment, the unique sequence number and process date provided by the all items file 48 of the suspect identifier 14 allows access to the archives 80 to obtain a copy of the corresponding transaction as evidence and confirmation of participation in a fraudulent scheme. Any single transaction or group of transactions may be requested from the archives 80 through use of the archive engine 20. This eliminates the manual entry of indexing information and significantly improves productivity.

In a particular embodiment, the system 10 is implemented as VECTOR:Kite, manufactured by Sterling Commerce, Inc., the assignee of the present application. In this embodiment, the software for the system 10 is written in command level COBOL and operates on IBM's system 370 or compatible hardware under a virtual storage operating system. The system 10 generally conforms to the IBM common user access standards for developing user interfaces on non-programmable terminals.

In accordance with one embodiment, the suspect evaluator 16 groups transactions by account number and by routing number. Each unique account number and routing number combination forms a set called ACCOUNTROUTE. In other words, all the amounts deposited into one particular account from another particular account form the set to be analyzed. Other criteria, such as minimum amount and time period that will be analyzed, may be defined by a user in the parameter file 22. Let the count of deposits for an ACCOUNTROUTE=n.

A score may be calculated for each ACCOUNTROUTE using a plurality of factors and WEIGHTS. According to one embodiment, the factors comprise a round factor, an equal factor, a proportion used factor, a four-day thousands factor, a return factor, an uncollected funds factor, or any other suitable factor.

For the round factor, a user-defined parameter in the parameter file 22 determines whether numbers evenly divisible by 100, 1,000 or other suitable value constitute a rounded number. The user-defined value is the round factor. For an exemplary embodiment, the round factor will be defined as 100. Thus, $$ROUNDFAC = \text{Count of } MULT100/n,$$

where Count of MULT100 is the count of rounded numbers.

The ACCOUNTROUTE is scored according to the extent of duplication of dollar amount of deposits. Thus, $$EQUALFAC = (\text{Sum of } c^2)/n^2,$$

where c is the count for a specific dollar amount, if the count is greater than 1.

For example, for a sequence of deposit dollars comprising the values 2204, 2204, 2204, 2204, 2204, 6340, 6340, 110364 and 121491, the EQUALFAC is calculated as follows:

$$EQUALFAC = (5^2 + 2^2)/9^2 = 0.358$$

Therefore, an EQUALFAC of 1 indicates that all the dollar amounts deposited to an ACCOUNTROUTE were the same, and an EQUALFAC of 0 indicates that all the dollar amounts deposited were different.

The activity of the ACCOUNTROUTE is quantified with the proportion used factor. Let $t_0$ be the date that the suspect evaluator 16 is evaluating suspects. Then $t_{-1}$ to $t_{-10}$ to represents the previous 10 business days. For example, if Feb. 15, 2000, is $t_0$, then $t_{-1}$ to $t_{-10}$ would be February 1, 2, 3, 4, 7, 8, 9, 10, 11 and 14.

$$PROPUSEDFAC = NUMBERDATES/EARLYDATE,$$

where EARLYDATE is the earliest date of $t_{-1}$ to $t_{-10}$ that had deposit activity and NUMBERDATES is the count of individual dates that had deposits. For the sequence of deposit dates comprising February 3, 4, 8, 9, 11 and 14, the PROPUSEDFAC is calculated as follows:

$$PROPUSEDFAC = 6/8 = 0.75$$

The four-day thousands factor scores the ACCOUNTROUTE according to the dollar amount of the deposits in the preceding four days ($t_{-1}$ to $t_{-4}$). It will be understood that the four-day thousands factor may be based on any suitable number of days as defined by a user in the parameter file 22. A higher value for this factor indicates higher deposit activity, while a lower value indicates lower deposit activity. Let DEP4 be the sum of deposits to an ACCOUNTROUTE for $t_{-1}$ to $t_{-4}$.

ADJDEP4=min(max(DEP4,10000),1000000)

This adjustment, ADJDEP4, moves all DEP4 amounts to the range [10000,1000000]. Then, DEP4FAC=0.5*($\log_{10}$(ADJDEP4)-4), where DEP4FAC is the four-day thousands factor. Thus, a DEP4 of $10,000 or less has a DEP4FAC of 0, and a DEP4 of $1,000,000 or more has a DEP4FAC of 1.00. There is a logarithmic curve upwards from $10,000 to $1,000,000. Thus, a DEP4 of $100,000 has a DEP4FAC of 0.5.

The return factor indicates whether ACCOUNT had a returned deposit in the past 10 days ($t_{-1}$ to $t_{-10}$). It will be understood that the return factor may be based on any suitable number of days as defined by a user in the parameter file 22. Thus, RETURNFAC=1 if a deposit was returned in $t_{-1}$ to $t_{-10}$=0 otherwise RETURNFAC is attributed to ACCOUNTROUTE.

The uncollected funds factor indicates whether ACCOUNT drew on uncollected funds in the past 10 days ($t_{-1}$ to $t_{-10}$). It will be understood that the return factor may be based on any suitable number of days as defined by a user in the parameter file 22. Thus, UNCOLLECTFAC=1 if ACCOUNT drew on uncollected funds=0 otherwise UNCOLLECTFAC is also attributed to ACCOUNTROUTE.

User-defined WEIGHTS are assigned to each factor as follows:
WEIGHTROUNDFAC=WROU
WEIGHTEQUALFAC=WE
WEIGHTPROPUSEDFAC=WP
WEIGHTDEP4FAC=WD
WEIGHTRETURNFAC=WRET
WEIGHTUNCOLLECTFAC=WU
A SCORE for ACCOUNTROUTE is calculated as follows:

SCORE=SUMWEIGHTFAC/DIVISOR, where

SUMWEIGHTFAC=WROU*ROUNDFAC+
 WE*EQUALFAC+WP*PROPUSEDFAC+
 WD*DEP4FAC+WRET*RETURNFAC+
 WU*UNCOLLECTFAC, and

DIVISOR=WROU+WE+WP+WD+WRET+WU.

Each ACCOUNT may then be ranked according to the ACCOUNTROUTE Score.

FIG. 2 is a flow diagram illustrating a method for identifying and evaluating fraud suspects in accordance with one embodiment of the present invention. The method begins at step 200 where the potential suspect identifier 12 identifies a number of potential kite suspects through the use of the DDA system 30 and/or the kite suspect detection system 32 that identify accounts whose monetary transaction information includes certain monetary items, such as drawn on uncollected funds and returns, and through the identification of particular types of accounts, such as new accounts and employee accounts. In addition, the potential suspect identifier 12 may include a number of accounts that have been specifically identified for some other reason by a user of the system 10 as accounts to be further analyzed through the use of the suspect entry engine 34. Thus, the potential suspect identifier 12 generally identifies a relatively large number of potential suspects that are generally too numerous to research and analyze cost-effectively.

At step 202, the potential suspect data from the potential suspect identifier 12 is passed to the suspect identifier 14, which applies a set of identification rules to the potential suspect data in order to generate suspect data for a significantly smaller number of actual suspects in step 204. The suspect identifier 14 also receives user-defined parameters from the parameter file 22 which includes exclusion criteria, such as minimum dollar amounts for monetary transactions, in order to reduce the number of items to be considered when identifying suspects.

Only those accounts satisfying the identification rules are included in the suspect data generated by the suspect identifier 14. This typically results in a substantial reduction in the number of suspects as compared to the number of potential suspects. However, researching and analyzing even the smaller number of suspects requires significant time and labor.

At step 206, the suspect data from the suspect identifier 14 is passed to the suspect evaluator 16, which applies a set of evaluation rules to the suspect data in order to generate suspect evaluator output including a score for each suspect in step 208. Each of the evaluation rules also includes a user-defined weighting factor that assigns a different weight for satisfying the corresponding rule. Statistical analysis of data derived from actual kiting schemes may be used to determine the parameters associated with the evaluation rules, including the dollar amounts, time periods, and weights. These parameters, which may be modified as necessary by a user of the system 10, are stored in the parameter file 22. Thus, the evaluation rules and their corresponding weighting factors may be customized for a particular financial institution and/or for a particular type of fraud.

At step 210, the research engine 18 processes the suspect evaluator output. Using the research engine 18, a user of the system 10 may research varying aspects of the suspect evaluator output and may generate different types of reports based on the suspect evaluator output with the report generator 70.

FIG. 3 is a flow diagram illustrating a method for evaluating fraud suspects with the suspect evaluator 16 in accordance with one embodiment of the present invention. The method begins at step 250 where the filter 60 receives the suspect data from the suspect identifier 14. The suspect data may include accounts identified in the drawn on uncollected funds file 64 and in the report file 66 and may exclude accounts identified in the evaluation exemption file 68. The filter 60 also receives user-defined parameters from the parameter file 22. These parameters include further exclusion criteria for specific items, such as transaction age, dollar amount, and the like.

Thus, in step 252 the filter 60 includes some accounts for consideration not previously identified as suspects and filters out a number of items and accounts from consideration as suspects. The filter 60 also categorizes the remaining accounts into convenient categories in step 252. For example, the accounts may be split up into different categories based on employee accounts versus non-employee accounts, based on dollar amounts, and/or based on the dates that suspect activity occurred. The filter 60 may also provide some weighting to the suspect data before generating filtered suspect data.

At step 254, the consolidator 62 receives the filtered data from the filter 60, as well as user-defined parameters from the parameter file 22. At step 256, the consolidator consolidates multiple items for a particular account/routing-and-transit number combination into a single item and provides weights for the evaluation rules by way of the parameters. An account/routing-and-transit number combination identifies a customer's account for the financial institution implementing the system 10 in combination with a corresponding financial institution from which deposits are received and to which deposits are made by the customer. The consolidator 62 may also further categorize the accounts based on employee accounts versus non-employee accounts, based on dollar amounts, and/or based on the dates that suspect activity occurred, depending on the categorization done by the filter 60 and the categorization desired by a user of the system 10.

Using the evaluation rules, the consolidator 62 generates the suspect evaluator output, which includes a score for each suspect in step 256. This score is a relative value that represents the likelihood that the suspect is engaged in a kiting scheme. The suspect evaluator output, along with additional user-defined parameters from the parameter file 22, is provided to the report generator 70 of the research engine 80, which is capable of generating a variety of reports.

FIG. 4 is one embodiment of a report 300 generated by the evaluation system 10. According to this embodiment, the report 300 comprises a plurality of columns, each providing a piece of information relating to the suspects identified in each row. The report 300 includes a rank field 302 which defines the overall ranking of the corresponding suspect. The account/route field 304 identifies an account number for the suspect in conjunction with a routing-and-transit number associated with a corresponding financial institution. The proportion used field 306 defines the proportion of days on which deposits have occurred during the last ten business days. It will be understood that the report may be based on any suitable number of days without departing from the scope of the present invention. The round factor field 308 includes the proportion of deposits that are evenly divisible by a particular multiple, such as 100 or 1000. This multiple is defined by a user in the parameter file 22. The equal factor field 310 defines a dollar duplication factor relating to the number of times an equal dollar amount was deposited into the account from the corresponding financial institution.

The deposits field 312 displays the total number of deposits for the account/route during the ten-day business cycle. The time frame field 314 displays the number of days from the first deposit to the last deposit during the ten-day business cycle. The days with deposits field 316 displays the number of different days during which deposits occurred within the ten-day business cycle. The four day thousands field 318 displays a factor based on the total dollar amount deposited during the last four business days. The return indicator field 320 displays a 1 if one or more returns exist for the account/route. Otherwise, the return indicator field 320 displays a 0.

The score field 322 displays a factor representing the likelihood of fraud for the corresponding account/route. The score is determined by the suspect evaluator 16 based on the data in the fields 306, 308, 310, 314, 316, 318 and 320, in addition to other user-defined parameters. The rank is based on the score such that the closer the score is to 1, the higher the corresponding account/route is ranked. In accordance with the exemplary embodiment, over 98% of the potential losses due to kiting may be identified within the suspects ranking in the upper 10% of all suspects identified by the suspect identifier 14. Thus, the amount of time and labor required to verify actual kiting schemes is greatly reduced. The customer ID field 324 displays a customer identification number associated with the account and may be used for cross-referencing in reports or for further analysis.

Although the present invention has been described with several embodiments, various changes and modifications may be suggested to one skilled in the art. It is intended that the present invention encompass such changes and modifications as fall within the scope of the appended claims.

What is claimed is:

1. A system for evaluating fraud suspects, comprising:
a non-transitory computer-readable medium storing computer-readable instructions; and
one or more processors that are operable to execute the computer-readable instructions to perform operations comprising:
receiving suspect data identifying a plurality of suspects, each suspect suspected of a fraudulent scheme involving a plurality of fraudulent transactions, the fraudulent transactions from at least one checking account associated with the suspect;
receiving, for each suspect, monetary transaction information of a financial institution, the monetary transaction information comprising information associated with a plurality of transactions of the suspect, the plurality of transactions comprising the plurality of fraudulent transactions;
determining, based on the monetary transaction information of the financial institution, a value for each of a plurality of criteria associated with the suspected fraudulent scheme for each suspect; and
applying criteria weights to the values for each suspect to generate a score for the suspect indicative of a likelihood that the suspect is involved in the fraudulent scheme involving the plurality of fraudulent transactions.

2. The system of claim 1, wherein the criteria associated with the fraud are statistically important to identifying the fraudulent scheme.

3. The system of claim 1, wherein the fraudulent scheme comprises check kiting fraud.

4. The system of claim 3, the criteria comprising a transaction frequency greater than a predetermined value.

5. The system of claim 3, the criteria comprising a transaction frequency from a specified institution greater than a predetermined value.

6. The system of claim 5, the transaction frequency comprising a deposit frequency.

7. The system of claim 3, the criteria comprising a first transaction frequency and a second transaction frequency.

8. The system of claim 7, wherein the first frequency is measured over a period of time of about four days and the second frequency is measured over a period of time of about ten days.

9. The system of claim 3, the criteria comprising a check written on one of the checking accounts in excess of a collected balance for the account.

10. The system of claim 3, the criteria comprising at least two deposits having a same dollar amount within a specified period of time.

11. The system of claim 3, the criteria comprising round-number transactions.

12. The system of claim 3, the criteria comprising returned items from or to a financial institution.

13. The system of claim 3, the criteria comprising a transaction frequency, at least two deposits having a same dollar amount within a specified period of time, and one or more round-number transactions.

14. The system of claim 1, the operations further comprising ranking the suspects based on the scores for the suspects.

15. The system of claim 1, the operations further comprising receiving an initial set of suspect data identifying an initial set of suspects of the fraud and filtering the initial set of suspect data to exclude a portion of the suspects from further evaluation.

16. The system of claim 1, the operations further comprising generating consolidated information by consolidating items in the monetary transaction information for each suspect and determining from the consolidated information the value for each of the criteria associated with the fraudulent scheme for each suspect.

17. A system for detecting a fraudulent scheme at a financial institution, comprising:
    a non-transitory computer-readable medium storing computer-readable instructions; and
    one or more processors that are operable to execute the computer-readable instructions to perform operations comprising:
        identifying potential suspects of a fraudulent scheme on a financial institution based on transactions by the potential suspects with the financial institution, the fraudulent scheme involving a plurality of fraudulent transactions, the fraudulent transactions from at least one checking account associated with the suspect;
        applying a set of identification rules to monetary transaction information of the financial institution for each potential suspect to identify suspects from the potential suspects, the identification rules including a plurality of criteria indicative of the fraudulent scheme, the monetary transaction information of the financial institution comprising information associated with a plurality of transactions of the suspect, the plurality of transactions comprising the plurality of fraudulent transactions; and
        applying a set of evaluation rules to monetary transaction information for each suspect to generate a score indicative of the likelihood that the suspect is involved in a scheme involving a plurality of fraudulent transactions, the evaluation rules including the criteria and relative weights for the criteria.

18. The system of claim 17, wherein the criteria associated with the fraud are statistically important to identifying the fraudulent scheme.

19. The system of claim 17, wherein the fraudulent scheme comprises check kiting fraud.

20. The system of claim 17, the criteria comprising a transaction frequency greater than a predetermined value.

21. The system of claim 17, the criteria comprising a transaction frequency from a specified institution greater than a predetermined value.

22. The system of claim 21, the transaction frequency comprising a deposit frequency.

23. The system of claim 19, the criteria comprising a first transaction frequency and a second transaction frequency.

24. The system of claim 23, wherein the first frequency is measured over a period of time of about four days and the second frequency is measured over a period of time of about ten days.

25. The system of claim 19, the criteria comprising a check written on one of the checking accounts in excess of a collected balance for the account.

26. The system of claim 19, the criteria comprising at least two deposits having a same dollar amount within a specified period of time.

27. The system of claim 19, the criteria comprising round-number transactions.

28. The system of claim 19, the criteria comprising returned items from or to a financial institution.

29. The system of claim 19, the criteria comprising a transaction frequency, at least two deposits having a same dollar amount within a specified period of time, and one or more round-number transactions.

30. The system of claim 17, the operations further comprising ranking the suspects based on the scores for the suspects.

31. The system of claim 17, the operations further comprising receiving an initial set of suspect data identifying an initial set of suspects of the fraud and filtering the initial set of suspect data to exclude a portion of the suspects from further evaluation.

32. The system of claim 17, the operations further comprising generating consolidated information by consolidating items in the monetary transaction information for each suspect and determining from the consolidated information the value for each of the criteria associated with the fraudulent scheme for each suspect.

* * * * *

UNITED STATES PATENT AND TRADEMARK OFFICE
CERTIFICATE OF CORRECTION

PATENT NO. : 8,775,284 B1
APPLICATION NO. : 09/545046
DATED : July 8, 2014
INVENTOR(S) : Thomas J. Crook, Mark J. Nigrini and John W. Howell Page 1 of 1

It is certified that error appears in the above-identified patent and that said Letters Patent is hereby corrected as shown below:

In the Claims

In Column 12, In Line 3, In Claim 20, delete "claim 17," and insert -- claim 19, -- therefor.

In Column 12, In Line 5, In Claim 20, delete "claim 17," and insert -- claim 19, -- therefor.

Signed and Sealed this
Twenty-seventh Day of January, 2015

Michelle K. Lee
*Deputy Director of the United States Patent and Trademark Office*